Feb. 19, 1963  G. H. ARRASMITH  3,077,957
BRAKE SHOE KEY
Original Filed Aug. 4, 1960  2 Sheets-Sheet 1
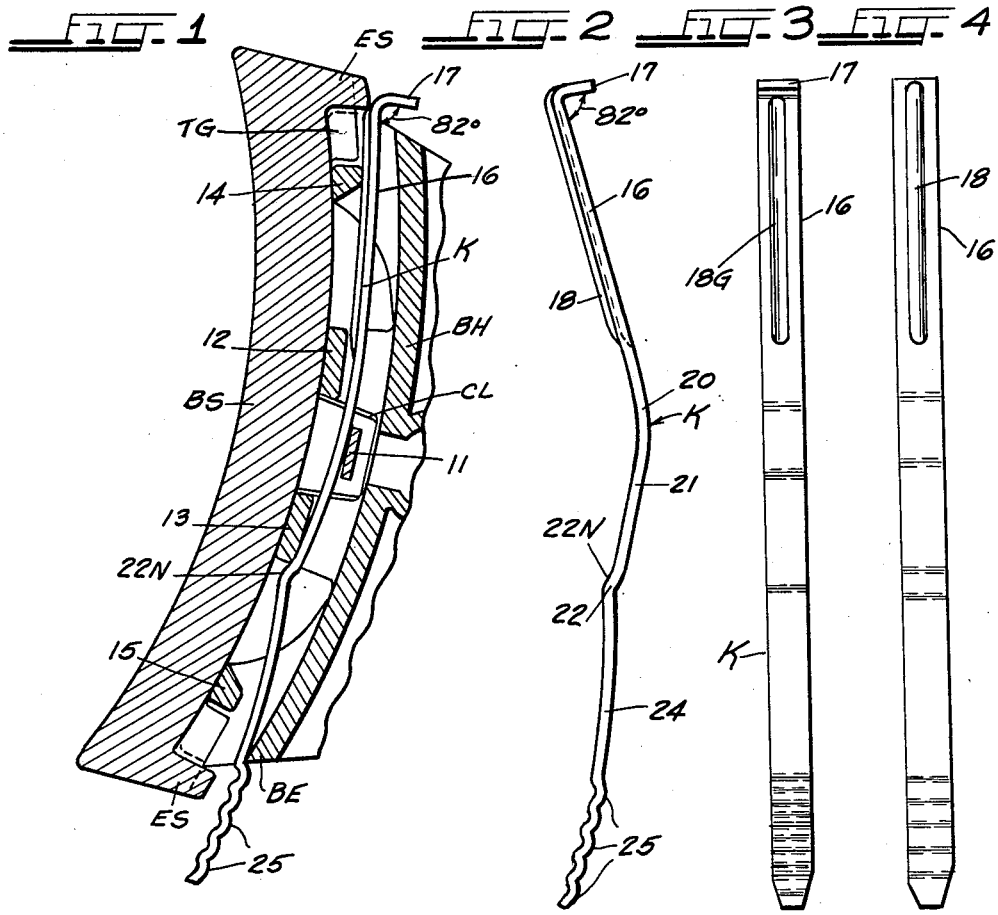
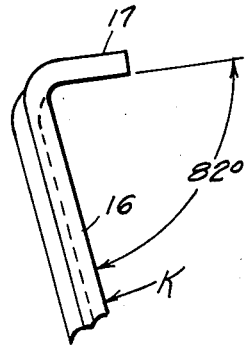
INVENTOR.
GRANT H. ARRASMITH
BY
Wallace, Kinzel and Horn
ATTYS.

Feb. 19, 1963
G. H. ARRASMITH
3,077,957
BRAKE SHOE KEY
Original Filed Aug. 4, 1960
2 Sheets-Sheet 2
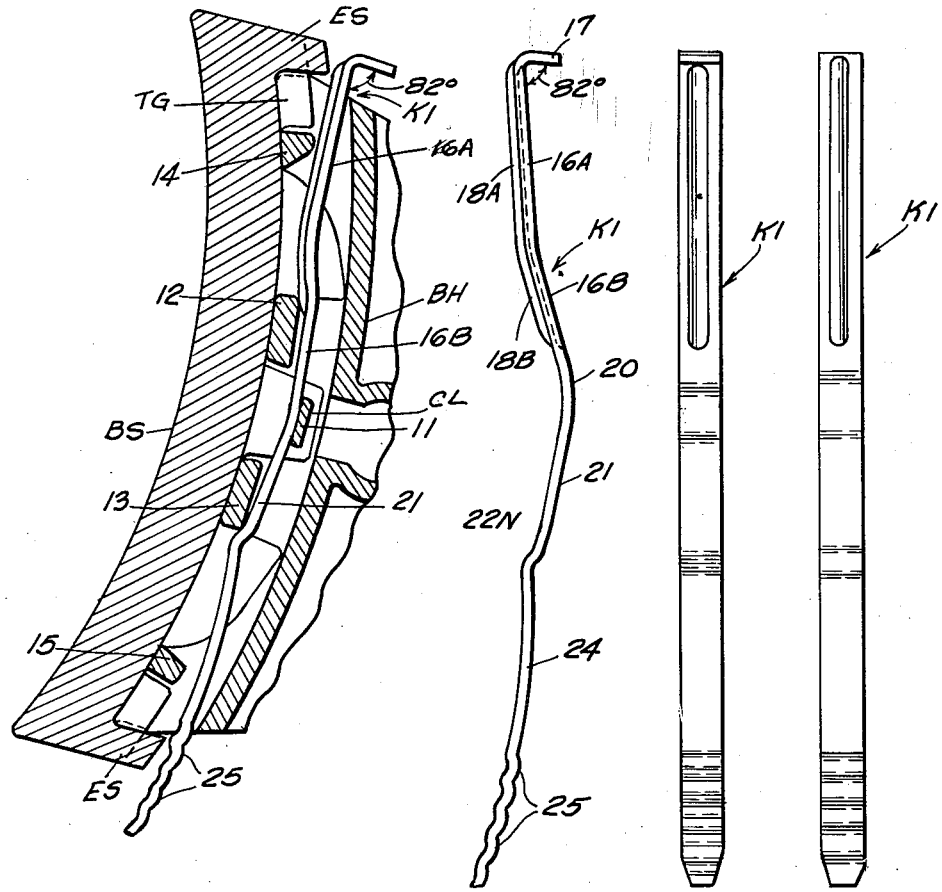
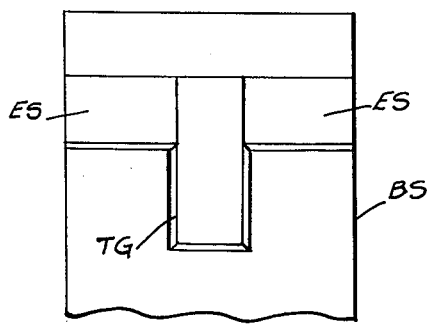
INVENTOR.
GRANT. H. ARRASMITH
BY
Wallace, Kinzer and Horn
ATT'YS.

United States Patent Office 3,077,957
Patented Feb. 19, 1963

3,077,957
BRAKE SHOE KEY
Grant H. Arrasmith, Pearl River, N.Y., assignor to American Brake Shoe Company, New York, N.Y., a corporation of Delaware
Continuation of application Ser. No. 47,530, Aug. 4, 1960. This application Nov. 1, 1961, Ser. No. 150,115
2 Claims. (Cl. 188—243)

This invention relates to retaining keys and more particularly to keys which are effective to retain a brake shoe on the brake head therefor on railway equipment. This application is a continuation of my application Serial No. 47,530, filed August 4, 1960, now abandoned.

Railway equipment such as freight cars and the like that are passed from one railroad line to another are required to include parts, of which brake heads, brake shoes and brake shoe retaining keys are examples, which are made in accordance with AAR specifications pertaining to the particular part. Hence, such parts are standard and may readily be replaced when the need so to do arises on a particular car even though the car is not owned by the railroad on which such replacement is to be made. Brake shoes are examples of parts that wear out in service and which are required to be replaced when worn to a specified extent. Hence, the brake shoes are detachably connected to the brake heads by a key which is removed to enable a worn brake shoe to be replaced when the need so to do arises. It is therefore essential that brake shoe keys be readily removable in order that a replacement such as the foregoing may be expeditiously effected, and to afford a key which will be extremely effective when installed and yet readily removable when the need so to do arises is the primary object of this invention.

Heretofore brake shoe keys have been of two general kinds of which one is the so-called wedge type key which is formed to include a decreasing taper from the head end toward the leading end thereof. Such a key is driven into a keyway afforded by interfitting parts of the brake head and shoe to attach the shoe to the head by a wedging effect. In service it has been found that such keys may become loosened to such an extent that relative movement between the shoe and the head on which the same is mounted may occur and in such circumstances the brake head, especially when formed of malleable iron, may wear excessively, so as to require replacement long before the expected life of such a brake head has been attained.

Another type of key which has been employed to interconnect a brake shoe to a brake head has been of the spring type. Such a key is formed from spring steel and is of such configuration that it is under tension when serving to interconnect a brake shoe to a brake head. While such keys are effective to prevent objectionable wear of the brake head it has been found in certain circumstances that such keys sometimes tend to become locked in position which makes removal thereof difficult when this is required in order to enable replacement of a brake shoe.

It is therefore yet another important object of this invention to afford a spring type brake shoe key that is of such nature that it will effectively secure a brake shoe to a brake head in such a way as to preclude relative movement therebetween and yet insure that the key may be expeditiously removed when the need so to do arises.

Brake shoe keys of the spring type are frequently formed from a single strip of steel of the proper width to fit in the keyway afforded between an interfitted brake head and brake shoe, and a suitable configuration is imparted to such a steel grip in a forging operation, the key being tempered to have spring properties when the forging operation is completed. It is desirable that brake shoe keys of this nature be relatively inexpensive, and in order that this may be realized it has been customary to form such keys in a suitable forging machine and in a single operation of such a machine. Heretofore a key of this nature has included a head portion which extended at right angles to a straight portion of the key adjacent thereto since this insured that the key could be formed in a single operation of a forging machine. However, I have found that the head of a key of the aforesaid nature may be formed to extend at an acute angle with respect to an adjacent part of the key in a single operation of a forging machine. So to do affords a head portion on a key with which a prying instrument, such as a crowbar, may be engaged to pry the spring key from the keyway in which the same is disposed and yet assure that a good purchase for the prying instrument will be afforded so that the same will not tend to slip off the head of the key in the course of the prying operation, and to enable especially the head of the key to be so formed is yet another object of this invention.

Other and further objects of the present invention will be apparent from the following description and claims and are illustrated in the accompanying drawings which, by way of illustration, show a preferred embodiment of the present invention and the principle thereof and what is now considered to be the best mode for applying this principle. Other embodiments of the invention embodying the same or equivalent principles may be made as desired by those skilled in the art without departing from the present invention and the purview of the appended claims.

In the drawings:

FIG. 1 is a vertical sectional view through a keyway afforded when a brake shoe is mounted on a brake head wherein the key is shown in elevation;

FIG. 2 is a side elevation of the key shown in FIG. 1 and depicting the configuration of the key prior to the time the same is placed under tension when properly positioned in the keyway;

FIG. 3 is a rear elevation of the key shown in FIG. 2;

FIG. 4 is a front elevation of such key;

FIG. 5 is a detail view, drawn to an enlarged scale, of the head portion of the novel key of this invention;

FIG. 6 is a vertical sectional view through a keyway afforded when a brake shoe is mounted on a brake head and wherein a modified form of the key of this invention is shown in elevation;

FIG. 7 is a side elevation of the key shown in FIG. 6 and depicting the configuration of the key prior to the time the same is placed under tension when properly positioned in the keyway;

FIG. 8 is a rear elevational view of the key shown in FIG. 7;

FIG. 9 is a front elevation of the key shown in FIGS. 7 and 8; and

FIG. 10 is a fragmentary elevational view of one end of the brake shoe illustrated in FIGS. 1 and 6.

Referring first to FIGS. 1 to 5 inclusive, the brake shoe BS, formed of cast iron or other suitable material, is mounted on a brake head BH, each being of standard configuration. The brake shoe BS is considerably longer than it is wide and thick and opposite of the longer faces thereof are arcuate and parallel one to the other as illustrated in FIGS. 1 and 6. At each end the brake shoe is provided with an end stop as ES and a toe guide as TG which cooperate with related parts on the brake head BH for the purposes and in the manner well understood in the art. On the back of the brake shoe and medially in the extent thereof is a center attaching lug CL which includes a steel strap 11, the inner surface of which is disposed toward the back of the brake shoe and forms a part of the keyway into which a brake shoe key is to be inserted.

The brake head includes the usual brake head pads 12 and 13 which are adapted to be disposed on opposite sides of the center attaching lug CL of the brake shoe when a shoe is mounted in the head, the inner surfaces of such pads engaging the back of the brake shoe when the same is secured to the head as shown in FIGS. 1 and 6. The brake head also includes tie bars 14 and 15 the inner faces of which are adapted to engage the rear face of the brake shoe as BS immediately inwardly of the toe guides as TG on a brake shoe as BS when the shoe is mounted on a brake head as BH.

The key K shown in FIGS. 1 to 4, is desirably formed from a steel strip, the width of which is such that it will fit neatly into the keyway that is afforded when a brake shoe as BS is mounted on a brake head as BH. The thickness of the steel strip from which the key K is formed is sufficient to insure the required sturdiness of the key when the same is under tension in the keyway, and yet is no thicker than the depth of the aforesaid keyway adapted to receive the same.

The key K includes a straight portion 16 adjacent to the upper end thereof. The head 17 of the key K is provided at the free end of the straight portion 16 and extends at an acute angle with respect to the rear face of the straight portion 16 of the key. Desirably, and as best shown in FIG. 5, the angular extent of the head 17 with respect to the rear face of the straight portion 16 of the key C is such that the lower face of the head 17 extends at an angle of no more than 82° relative to the adjacent rear face of the straight portion 16 of the key K. Such relation of the head 17 to the straight portion 16 enables the novel key of this invention to be formed in a single operation of the forging machine employed to form the key, and still permits the key to be removed from the die in the forging machine in which the key is formed. Moreover, the thickness of the key K is such that the same will fit neatly into the keyway that is afforded when a brake shoe as BS is mounted on a brake head as BH.

The key K includes a flute or rib 18 that extends medially of the straight section 16 on one side thereof. The rib is forged during forging of the key K and such ersults in a complemental groove 18G, FIG. 3, on the opposite side of the key shank. Such rib is so located and proportioned with respect to adjacent parts of the key as to afford firm contact with the adjacent one of the tie bars 14 when the key is located under tension in the keyway afforded therefor, and serves to facilitate initial insertion of the key.

The straight portion 16 of the key K terminates at a bend 20 which is displaced slightly to one side of the geometric center of the key shank as will be noted particularly in FIG. 2, and beyond the bend 20 the key includes a straight portion 21 in the free state of the key. Thus, the key shank is arched at 20 to effect a spring.

The straight portion 21 terminates in an angled or stepped portion 22 which is bent in the direction of the leg 21, but at a sharper angle in order to afford a locking notch or shoulder 22N which will abut one edge of the brake head pad 13 when the key K is properly inserted. It will be noted in this connection that the other brake head pad 12 is disposed under the end of the rib 18 that is adjacent the bend 20, but is free of the rib 18 when the key is disposed in operative position.

Beyond the locking notch 22N, the key K is formed with a relatively long but slightly bowed portion 24 which is bowed in the direction of the bend 20 but has a much longer radius of curvature. The terminal end of the key K opposite the head 17 is defined by a series of sinuous bends 25 which afford a plurality of end notches engageable with the adjacent end edge BE of the brake head as will be apparent in FIG. 1.

In positioning the key K, the same is inserted into the keyway from what amounts to the upper end thereof as viewed in FIG. 1. After initial firm positioning to the extent that the key will properly be guided through the keyway when forcefully driven, a series of blows are then imparted to the head 17 so as to drive the key through the keyway to the extent that the key is fully inserted into position with the locking notch located as shown in FIG. 1, and with the end retaining notches 25 thereof extended beyond the lower end stop ES as viewed in FIG. 1 with the last or innermost one of the bends 25 disposed opposite the adjacent end edge BE of the brake head plate. Under these circumstances, the bend 20 is in effect somewhat straightened due to the extreme tension of the key in the keyway such that the portions 16, 20 and 21 of the key are virtually on a common curve as will be evident in FIG. 1. Under these conditions, the key under tension is effective to apply retaining forces in opposite directions against the strap 11 of the brake shoe center attaching lug CL on one hand, and against the brake head pad 13 and tie bar 14 on the other hand. The rib or flute 18 is free of the pad 12 as has been noted.

Another form of key is illustrated in FIGS. 6 to 9 inclusive, the key being identified at K1 in this instance. The key K1 is substantially the same in construction as the key K, and like reference characters are used to identify identical parts. Thus, the same angular relationship is present between the head 17 of the key K1 and the straight portion of the shank of the key immediately adjacent thereto. However, in this instance, the portion of the key immediately inward of the head 17 includes a straight portion 16A and an immediate extension 16B which is slightly bent relative to the portion 16A for a purpose to be mentioned. Resultantly, the rib or flute has two relatively bent portions 18A and 18B. The remaining parts, including the bend 20, the straight portion 21 adjacent thereto, the locking notch 22N, the slightly curved portion 24 outward of the notch 22N, and the reverse end bends 25 are identical to the construction described above for the key K.

The relative angle between the portions 16A and 16B accounts for a somewhat different application of forces between the opposed parts of the brake shoe and the brake head when the key K1 is inserted in the keyway which is defined by related parts in the same manner as the keyway described above in connection with the key K. Thus, in the instance of the key K1, the portions 16B and 21 respectively on opposite sides of the bend 20 thereof diverge at an angle when the key K1 is driven home in contrast to the smooth and gradual curve at the medial section of the key K when the latter is mounted in place. Additionally, the bend between the shank portions 16A and 16B of key K1 accounts for the lower end of the rib portion 18B, as viewed in FIG. 6, bearing forcefully against the adjacent edge of the brake head pad 12. Consequently, key retaining forces are applied to both brake head pads 12 and 13, whereas the rib portion 18A immediately adjacent the head 17 is free of the strap or tie bar 14.

In the keys above described, the angular relation between the inner face of the head of the key and the adjacent or upper face of the straight portion immediately adjacent thereto is an acute one less than 90° such as to enable the attainment of a good purchase of the prying tool with respect thereto, and consequently the tendency for the prying tool to slip off the head 17 during withdrawal of the key is substantially retarded. This angle is not more than 82° but is greater than the draft of the forging die in which the key is initially formed.

Hence, while I have illustrated and described the preferred embodiment of my invention, it is to be understood that this is capable of variation and modification, and I therefore do not wish to be limited to the precise

I claim:

1. In brake structure of the kind described including a railway brake shoe member having a center attaching lug and a railway brake head member having a pair of tie bars and a pair of pads between the tie bars defining a keyway with the center attaching lug, a brake shoe retainer key of the spring steel type disposed within said keyway, said key including substantially at the medial section thereof a locking notch engaging one of the opposed parts of said members, said key on one side of the locking notch including an arcuate portion bent in a predetermined direction and disposed in engagement with the center attaching lug of the brake shoe and the two pads, said key having at one end a head bent outward at an acute angle to the adjacent portion of the key, and said key between the head and the arcuate portion thereof being bent in a direction opposite the first-named bend, whereby the key is so tensioned within the keyway as to forcefully engage the center attaching lug and the pads while being free of engagement with the tie bars.

2. A brake shoe key of the spring steel type adapted to be interposed in a keyway afforded between a railway brake shoe and the brake head therefor and under tension in a three-point contact between opposed parts of the brake shoe and the brake head, and comprising when viewed in side elevation, an elongated shank having an intermediate portion of arcuate form bent in one direction to afford a convex face and an opposed concave face each having a predetermined radius of curvature, said key having at one end thereof a head so bent outward in the direction of the convex face as to include an acute angle between the inner surface of the head and the adjacent surface of a straight portion of the key between the head and the arcuate portion thereof to thereby afford a good purchase for the prying tool employed to withdraw the key in its tensioned state from said keyway, said key between the head and said arcuate portion including a concave-convex bend directed opposite to the bend which affords said arcuate portion, said key including a locking notch between said arcuate portion and the end of the key opposite said head, and said key in the portion between said locking notch and said opposite end of the key being bowed convexly in the same direction as said convex face but with a radius of curvature larger than that of said convex face.

References Cited in the file of this patent
UNITED STATES PATENTS

| | | |
|---|---|---|
| 2,013,982 | Clouser | Sept. 10, 1935 |
| 2,230,863 | Caslin | Feb. 4, 1941 |
| 2,331,797 | Oelkers | Oct. 12, 1943 |